United States Patent
Kulesa et al.

(10) Patent No.: US 9,114,551 B2
(45) Date of Patent: *Aug. 25, 2015

(54) POST-CONSUMER SCRAP FILM RECYCLING SYSTEM AND PROCESS

(71) Applicant: Wisconsin Film & Bag, Inc., Shawano, WI (US)

(72) Inventors: Robert Francis Kulesa, Green Bay, WI (US); James J. Feeney, Appleton, WI (US); Richard Wayne Carlstedt, Green Bay, WI (US); Daniel William Blake, Menasha, WI (US); Buckell Gary Hacker, Shawano, WI (US)

(73) Assignee: Wisconsin Film & Bag, Inc., Shawano, WI (US)

(*) Notice: Subject to any disclaimer, the term of this patent is extended or adjusted under 35 U.S.C. 154(b) by 25 days.

This patent is subject to a terminal disclaimer.

(21) Appl. No.: 14/245,078

(22) Filed: Apr. 4, 2014

(65) Prior Publication Data

US 2014/0209725 A1    Jul. 31, 2014

Related U.S. Application Data

(63) Continuation of application No. 14/029,951, filed on Sep. 18, 2013, now Pat. No. 8,690,090, which is a continuation of application No. 13/024,088, filed on Feb. 9, 2011, now Pat. No. 8,567,702.

(51) Int. Cl.
*B02C 21/00* (2006.01)
*B29B 17/04* (2006.01)
(Continued)

(52) U.S. Cl.
CPC ............. *B29B 17/0412* (2013.01); *B02C 21/00* (2013.01); *B29B 17/0026* (2013.01);
(Continued)

(58) Field of Classification Search
CPC .......... B29B 17/00; B29B 17/04; C08J 11/00; B02C 23/08
USPC .......................... 241/21, 19, 24.14, 25, 29, 20
See application file for complete search history.

(56) References Cited

U.S. PATENT DOCUMENTS 3,193,877 A    7/1965 Edwards
3,455,357 A    7/1969 Zink
(Continued)

FOREIGN PATENT DOCUMENTS

EP         0893220        1/1999

OTHER PUBLICATIONS

International Search Report and Written Opinion for International Application No. PCT/US2014/011850 dated May 13, 2014, 11 pages.

(Continued)

*Primary Examiner* — Mark Rosenbaum
(74) *Attorney, Agent, or Firm* — Reinhart Boerner Van Deuren s.c.

(57) ABSTRACT

A system for processing a supply of post-consumer scrap linear low density or low density polyethylene film into near-virgin quality blown film product. The system includes tearing the supply of film in a shredder, wherein the surface area of the film is exposed, including delaminating the film. The torn supply of film is washed in a hot water bath including a surfactant. The film is agitated in the bath containing the surfactant wherein contaminants on the film are removed from the film. The washed film is ground into smaller pieces and additional washing of the ground film in a rotating friction washer occurs wherein additional contaminants are removed from the film. The ground film is then dried in a dryer and compacted in a compactor without addition of water into granulated objects of near-virgin quality blown film product.

21 Claims, 2 Drawing Sheets

(51) Int. Cl.
  *B29B 17/00*  (2006.01)
  *B29K 23/00*  (2006.01)
  *B29L 7/00*  (2006.01)
  *B29K 105/06*  (2006.01)
  *B29B 17/02*  (2006.01)

(52) U.S. Cl.
  CPC ........... *B29B17/02* (2013.01); *B29B 17/04* (2013.01); *B29B 2017/0015* (2013.01); *B29B 2017/0289* (2013.01); *B29K 2023/0625* (2013.01); *B29K 2023/0633* (2013.01); *B29K 2105/065* (2013.01); *B29L 2007/008* (2013.01); *Y02W 30/62* (2015.05); *Y02W 30/622* (2015.05); *Y02W 30/625* (2015.05); *Y10T 156/11* (2015.01)

(56) References Cited

U.S. PATENT DOCUMENTS

| | | | |
|---|---|---|---|
| 3,720,645 A | 3/1973 | Nistri et al. | |
| 4,255,295 A | 3/1981 | Regnault et al. | |
| 4,391,971 A | 7/1983 | Massey et al. | |
| 4,453,905 A | 6/1984 | Bennett | |
| 4,830,188 A | 5/1989 | Hannigan et al. | |
| 5,225,130 A | 7/1993 | Deiringer | |
| 5,236,603 A | 8/1993 | Sampson | |
| 5,268,074 A | 12/1993 | Brooks et al. | |
| 5,419,634 A | 5/1995 | Bacher et al. | |
| 5,540,244 A | 7/1996 | Brooks et al. | |
| 5,876,644 A | 3/1999 | Nichols et al. | |
| 5,945,460 A | 8/1999 | Ekart et al. | |
| 5,951,940 A | 9/1999 | Nosker et al. | |
| 5,977,294 A | 11/1999 | Hoehn | |
| 6,056,901 A | 5/2000 | Hamatani et al. | |
| 6,436,322 B1 | 8/2002 | Fredl | |
| 6,455,667 B1 | 9/2002 | Kimura et al. | |
| 6,607,299 B1 | 8/2003 | Bacher et al. | |
| 6,812,201 B1 | 11/2004 | Weuthen et al. | |
| 6,838,496 B1 | 1/2005 | Goedicke et al. | |
| 7,244,813 B2 | 7/2007 | Dong et al. | |
| 7,380,973 B2 | 6/2008 | Goedicke et al. | |
| 8,567,702 B2 | 10/2013 | Kulesa et al. | |
| 8,690,090 B2 * | 4/2014 | Kulesa et al. | .............. 241/78 |
| 2008/0039540 A1 | 2/2008 | Reitz | |

OTHER PUBLICATIONS

Resch, M. et al. "Vermischte Und Verschmutzte Altkunststoffe Stofflich Verwerten", Kunstoffe International, Carl Hanser Verlag, Munchen, DE, vol. 80, No. 4, Apr. 1, 1990, pp. 493-495, XP000173800, ISSN: 0023-5563, p. 494, left-hand column, para. 2 and right-hand column, para. 1.

"Abbaubare Und Losliche Kunstoffe Eroffnen Neue Markte. Orecycle '88", Plastverarbeiter, Huethig GmbH, Heidelberg, DE, vol. 40, No. 1, Jan. 1, 1989 (Feb. 2, 1989), pp. 118/119, XP000080360, ISSN: 0032-1338, p. 119, col. 2-col. 4, col. 4, col. 5, line 15-line 36, figure 3.

Lietz, G.: Wiederaufbereiten von PE-Folienabfallen, Kunstoffe International, Carl Hanser Verlag, Kunchen, DE, vol. 73, No. 8, Aug. 1, 1983, pp. 414-418, XP002095855, ISSN: 0023-5563, p. 416, right-hand column, paragraph 3, col. 2, line 5-line 6; col. 2, line 65-line 66; col. 5, line 1-line 2, col. 5, line 27-line 31; col. 6, line 12-line 29.

* cited by examiner

POST-CONSUMER SCRAP FILM RECYCLING SYSTEM AND PROCESS

CROSS-REFERENCE TO RELATED APPLICATIONS

This application is a continuation of U.S. patent application Ser. No. 14/029,951, filed on Sep. 18, 2013, now U.S. Pat. No. 8,690,090, granted on Apr. 8, 2014, entitled "Post Consumer Scrap Film Recycling System," which in turn is a continuation of U.S. patent application Ser. No. 13/024,088, filed on Feb. 9, 2011, now U.S. Pat. No. 8,567,702, granted on Oct. 29, 2013, entitled "Post Consumer Scrap Film Recycling Process," both of which patent applications hereby incorporated herein by reference in their entirety.

BACKGROUND OF THE INVENTION

Field of the Invention

The present invention relates generally to a system and a process for recycling scrap, and more particularly to a system and a process for recycling post-consumer scrap linear low density polyethylene film and post-consumer low density polyethylene film.

Recycling of post-consumer plastic waste has received considerable publicity as being environmentally correct and "green." It is known that the majority of municipal, mixed post-consumer plastic waste includes polyethylene perephthalathe ("PET") materials, such as used in soda bottles and unpigmented high density polyethylene ("HDPE") materials, such as milk bottles. In a typical recycling procedure, the containers composed of PET and HDPE are separated from other waste and are then shredded into smaller pieces, cleaned, heated, and extruded or granulized for reuse as other products.

One type of post-consumer ("PC") scrap that has been difficult to recycle is polyethylene film. Typically, PC film material is a "stretch wrap" linear low density polyethylene ("LLDPE"). Because of the strength characteristics and the stretch characteristic of the LLDPE, such film is used as a baling material and as a wrap material for palletized loads or baling processes. Another type of PC film is low density polyethylene ("LDPE"), which is used as a wrap and for bags.

LLDPE film is used in wrapping and securing boxes, containers, or similar items on a pallet during shipping. Upon arrival at a given destination, such PC film is removed from the palletized materials and scrapped. Such PC film typically has labels that are glued onto the outside of the film as well as various markings that are placed on the film during the shipping process. The PC film typically is wrapped around the materials on the pallets several times so that there are layers upon layers of the PC film.

PC film is also used to bale other scrap material. When PC film is removed from the pallets or other bales, because of the high level of contamination such as dirt, oil, biological material, layering, label adhesives, etc. the PC film is either tossed in a landfill or processed as a filler for other plastic products. Reuse of the PC film as a viable blown film product for use as industrial film or a bag product has generally not been instituted. Typically, such used film has limited use due to high levels of contamination present which, in turn, causes severe processing issues as well as unpleasant properties in the finished product, for example, odor, discolorations and a "pitted" appearance.

The apparatus implementing the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is preferable that some or all of the aforesaid advantages and objectives be achieved without incurring any substantial relative disadvantage.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are addressed by the process of the present disclosure.

There is provided a process which may be implemented in an associated system for processing a supply of post-consumer scrap linear low density polyethylene film or low density polyethylene film into near-virgin quality blown film product. The system includes a shredder configured to tear the supply of multilayered film in the shredder. The shredder exposes the surface area of the film and delaminates the film. The torn film then goes into a water bath apparatus configured to wash the torn film in the water bath, which includes a surfactant and which agitates the film in the bath. Contaminates are removed from the delaminated film in the water bath.

From the water bath, the film is moved into a grinder which is configured to grind the film. The ground film is then moved to a plurality of rotating friction washers configured to wash the ground film, wherein additional contaminants are removed from the film. A dryer is configured to dry the ground film, resulting in the ground film containing not more than 10% by weight, water content. The dried film is compacted in a compactor configured to compact the dry, ground film, without additional water, into granulated objects of mere virgin quality blown film product. A conveyor network interconnects the various system equipment, with the conveyor network including one of a storage conveyor, an inclined conveyer, a discharge belt, a transport screw, and a pneumatic transport tube.

In another embodiment, the water bath may include a plurality of washers with at least one washer containing hot water. In a washer that contains hot water, the hot water is at least 140 degrees Fahrenheit and not more than 190 degrees Fahrenheit.

In another embodiment, the system includes a detector configured to detect metal in the supply of film, and includes subjecting the supply of film to a magnetic field to identify ferrous metal. Any ferrous metal detected is removed from the supply of film by a machine or by manual removal. The system may also include a detector configured as an X-ray machine to detect a non-film object.

The system may also include a granulator that is configured to form the granulated objects into pellets after they are compacted by the compactor.

There is further provided a system for processing post-consumer scrap film into a near virgin quality blown film product, with the film including one of a supply of multi-layer recyclable linear low density polyethylene plastic film and a supply of multi-layer recyclable low density polyethylene plastic film.

The system includes a detector configured to detect a non-film object in the supply of film. The detector may be configured as one of an X-ray producing apparatus and a magnetic field producing apparatus. The system further includes a machine configured to remove the non-film object detected in the film. The removal can be by machine or manual removal. The system includes a shredder configured to shred the supply of multi-layer plastic film after removal of the non-film object and to tear the shredded film exposing delaminated surface areas of the film. A filter screen is configured to receive and filter the shredded plastic film.

A water bath apparatus is configured to receive the filtered film from the filter screen. An agitator is coupled to the water bath apparatus and configured to agitate the water in the water bath apparatus to further delaminate and wet all surfaces of the shredded plastic film.

A wet grinder apparatus is configured to receive the shredded plastic film from the water bath, with the wet grinder configured to grind the plastic film. A rotating friction washer is configured to receive the wet ground plastic film, with the rotating friction washer configured to wash the ground plastic film wherein contaminants are removed. A cyclone apparatus is configured to receive the ground plastic film from the rotating friction washer, with the cyclone configured to separate a light, by weight, plastic film from a heavy, by weight, plastic film.

A pair of dryer apparatuses may be used, with one dryer apparatus configured to receive the light plastic film and one dryer apparatus configured to receive the heavy plastic film, with both dryer apparatuses configured to dry the plastic film so that the film contains not more than 10%, by weight, water content.

A compactor apparatus is configured to compact the dried plastic film received from the dryer apparatus, without the addition of water, into granulated objects of near virgin quality plastic, and the granulated objects may then be stored in a storage apparatus configured to receive the granulated objects of near virgin quality plastic film.

The method of processing the supply of film may include at least one of the washing processes using hot water having a temperature of at least 140° F., but not more than 190° F. During the process, metal may be detected in the supply of film and removed from the supply prior to the grinding process.

There is also provided a method for processing post-consumer scrap film into a near-virgin quality material suitable for a blown film product. The method includes providing one of a supply of recyclable linear low density polyethylene plastic film and a supply of low density polyethylene plastic film and removing the metal from the supply of plastic film. The plastic film is shredded after metal removal with the shredding process tearing the plastic film and exposing the surface area of the film. The shredded plastic film is discharged through a filter screen to a water bath, wherein the shredded plastic film is agitated to wet all the surfaces of the shredded plastic film. The plastic film is then removed from the water bath and a wet grinding of the plastic film occurs.

The ground plastic film is washed again in a rotating friction washer, wherein contaminants are removed from the plastic film. At least two different types of the washed ground plastic film is separated in a hydrocyclone, wherein lighter plastic film is separated from heavier plastic film. The ground plastic film is dried and compacted, without the addition of water, into granulated objects of near-virgin quality linear low density polyethylene plastic and near-virgin quality low density polyethylene plastic. The granulated objects are then either stored or used as raw material in a blown film operation.

There is further provided a method for processing post-consumer scrap film into a near-virgin quality material suitable for a blown film product. The method includes providing one of a supply of recyclable linear low density polyethylene plastic film and a supply of low density polyethylene plastic film and removing the metal from the supply of plastic film. The plastic film is then shredded after metal removal, wherein the plastic film is torn exposing the surface area of the film. The shredded plastic film is discharged through a filter screen to a water bath, wherein the film is agitated to wet all the surfaces of the shredded plastic film. The water bath includes a surfactant, for example, a detergent additive to assist in removal of contaminants. The washed plastic film is removed from the water bath and wet ground. The ground plastic film is washed again in a rotating friction washer, where additional contaminants are removed from the plastic film.

The plastic film may be subjected to a hydrocyclone for separating at least two different types of the washed ground plastic film. The lighter plastic film is separated from heavier plastic film in the hydrocyclone. The ground plastic film is dried so that it contains not more than 10 percent, by weight, water content. The dried ground plastic film is compacted, without the addition of water, into granulated objects of near-virgin quality polyethylene plastic, and is either stored or used as raw material in a blown film operation. The granulated plastic film can also be formed into pellets after the compacting step.

The apparatus to implement the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENTS

There is provided a method and apparatus for recycling post-consumer ("PC") scrap such as PC film which is difficult to recycle because of labels that are glued on the outside of the film as well as various markings that are placed on the film during the shipping process and other contaminates. In order to provide a viable blown film product that can be reused, the labeling, adhesives, other applied markings, and contaminates have to be removed from the PC film. It is the objective of the present disclosure to process the PC film (LLDPE and LDPE) into a near-virgin quality blown film product that can be used by itself or combined with virgin material.

For purposes of this application the term "near-virgin" shall mean a quality of the PC film compared to virgin material of blown film product. A test for such quality is a visual gel detection test. For purposes of this Application a "gel" is an unmelted portion of PC film or unmelted contaminate. In the test, the numbers of gels, independent of their size, are determined on a 12 inch by 12 inch square sample. Virgin material has a gel count of between 0 gels and 10 gels. Near-virgin material has a gel count of between 11 gels and 1,000 gels. Conventional PC product has a gel count that is much, much higher than the gel count of such near-virgin material. The Applicants have compared a conventional PC product to a PC product produced with the process and the system of the present disclosure, as summarized in the following table:

| Film Type | Gel Count (Range) | Gel Count (Typical) |
|---|---|---|
| Conventional PC | Very, Very High | 52,740 |
| Present Disclosure PC | 11-1000 | 720 |
| Virgin Material | 0-10 | 9 |

Figure 1:
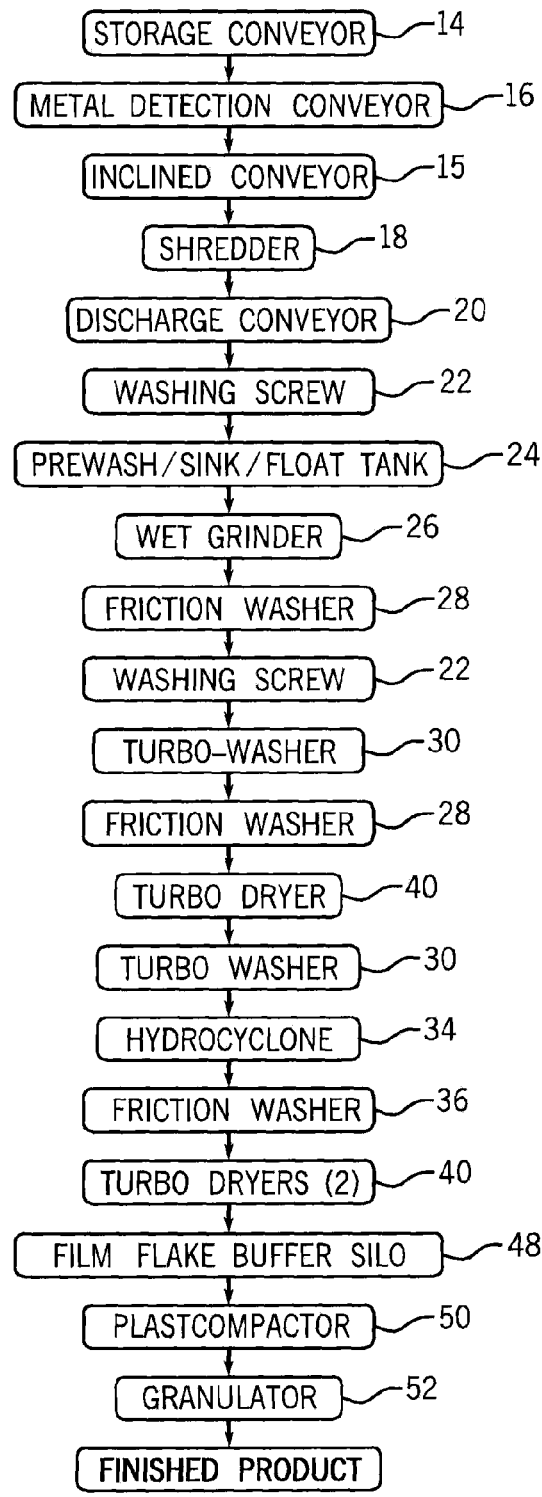
FIG. 1 is a flow chart of an exemplary embodiment of a process that may be used to recycle post-consumer ("PC") scrap film.
Figure 2:
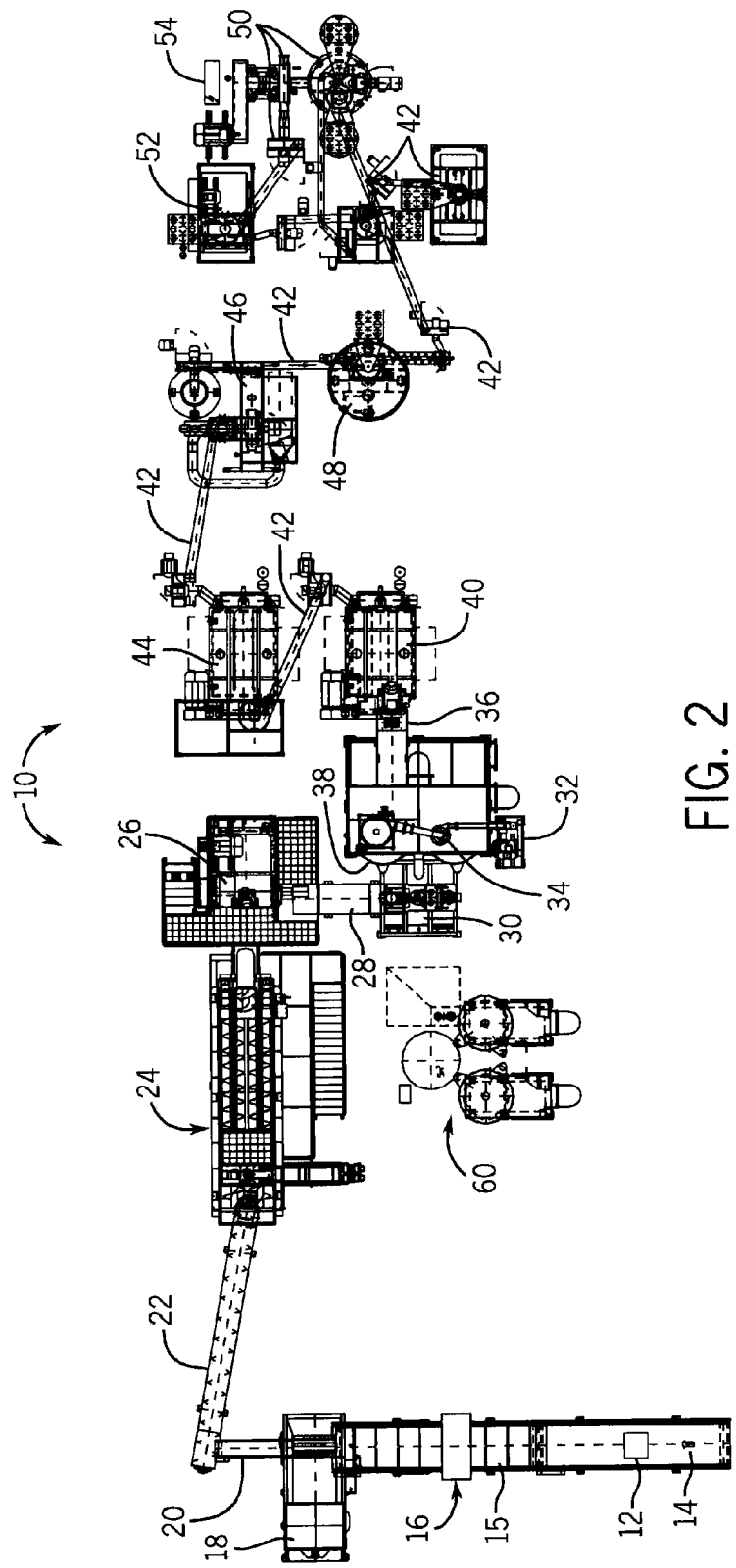
FIG. 2 is a schematic top view of an apparatus configured to process PC film in accord with some, but not all, of the process steps shown in the flow chart illustrated in FIG. 1.

Referring to the drawings, FIG. 1 is a flow chart of an exemplary embodiment of a preferred process for recycling post-consumer scrap film into a near-virgin quality blown film product. FIG. 2 is a schematic top view of exemplary embodiment of a system that may be configured to process PC film (through the addition of additional elements corresponding to the process steps shown in the flow chart illustrated in FIG. 1). It should be understood that the physical layout of the equipment, as illustrated in FIG. 2, is general in nature and exemplary of systems useful to process plastic scrap, and that other configurations requiring additional equipment as well as alternate equipment layouts are contemplated that require additions of equipment to or different arrangements of equipment within the boundaries of the general system layout shown in FIG. 2 to perform the processes described herein.

A supply of post-consumer scrap linear low density polyethylene ("LLDPE") film or low density polyethylene ("LDPE") film or a combination of LLDPE and LDPE film (hereinafter "PC film 12") is placed onto a storage conveyor 14. Placement of the supply of PC film 12 on the storage conveyor 14 can be by any convenient and conventional method such as a forklift, crane, hoist, and in some instances manual disposition. The storage conveyor 14 moves the supply of PC film 12 to an inclined conveyor 15.

The supply of PC film 12 typically is presented in bales held together by retainer bands. In a typical operation, the retainer bands are cut and the bale is pulled apart for initial visual inspection. Such process can be done manually, or by a machine, as determined by the operator. If any non-film objects are initially seen in the supply of PC film 12, such objects may be removed either manually or by machine.

The unbaled supply of PC film 12 is then moved by the storage conveyor 14 to an inclined conveyor 15 through or near a metal detector 16 (referred to in FIG. 1 as a metal detector conveyor since the metal detector is used in conjunction with the inclined conveyor 15) to facilitate removal of certain forms of metal. The metal detector 16 typically is an induction metal detector which has several forms of magnets, for example electromagnets, to detect and assist in removal of ferrous materials automatically. It is also contemplated that a series of permanent magnets within appropriate distances to the supply of PC film 12 can be used to detect and/or remove ferrous metal objects. Other types of detectors, for example an X-ray machine, can also be used to detect non-film objects.

The inclined conveyor 15 moves the supply of PC film 12 to a shredder 18, for example a Vecoplan or Wiema shredder, that is configured to tear-shred the PC film into chunks and pieces and discharge the shredded film through a screen. The screen size and the resultant film surface area may vary depending upon operational requirements. One example of a screen is one that has a plurality of 3-inch openings.

The shredder 18 is configured to tear the supply of PC film 12 wherein a surface area of the PC film 12 is exposed. The shredder 18 also delaminates the film. Because of typical shipping wrap process, the PC film 12 is layered one layer on top of another layer and the shredder 18 is configured to delaminate such layers, i.e. separate the film layers from one another. A shredder configured to cut the film typically fuses the film layers, making cleaning the film difficult, if not impossible.

The shredded supply of PC film 12 is moved by a discharge conveyor to a first washing (and transport) screw 22. The first washing screw 22 wets the shredded PC film 12 during resonance time of the PC film 12 in the first washing screw 22, and then conveys the wetted, shredded PC film 12 to a prewash/sink/float tank apparatus 24. While in the prewash/sink/float tank apparatus 24, further separation of high density materials not recognized by the metal detector 16, for example stone, glass, or sand, occurs, since they sink to the bottom of the prewash/sink/float tank apparatus 24 for later removal. While in the prewash/sink/float tank apparatus 24, the shredded PC film 12 is further wetted by agitation, performed, for example, by a series of rotating paddles.

Additional cleaning of the shredded PC film 12 is accomplished while in the prewash/sink/float tank apparatus 24 or subsequently by surfactants such as, for example, detergents and other compounds mixed into the prewash/sink/float tank apparatus 24 to further clean the film of contaminants such as inks, adhesives, etc.

Surfactants are substances that are added to liquids to reduce the surface tension of the liquid, thereby increasing the liquid's spreading and wetting properties. Surfactants are used, for example, to disperse aqueous suspensions of insoluble dyes. Such additives may also soften adhesives used to attach labels to the PC film 12. A preferred surfactant will include a detergent, an oxidizer, and a bleaching agent. It should be understood that the surfactant may include other chemicals or additives, including ionic and non-ionic agents. In addition to the cleaning of the shredded PC film 12 while in the prewash/sink/float tank apparatus 24, the agitation also promotes delamination of the shredded PC film 12, which has a tendency to stick to itself.

After a period of time as determined by the operator, the PC film 12 fragments are conveyed to a wet grinder 26 (also known as a first granulator). The wet grinder 26 grinds the PC film 12 and further reduces in size the PC film 12 area received from the shredder 18 and the prewash/sink/float tank apparatus 24. A typical particle size after the grinding or granulation process in the wet grinder 26 is approximately three-quarters of an inch. The grinding or granulation process in the wet grinder 26 also promotes further separation of wet labels from the PC film 12 substrate. From the wet grinder 26, the ground or granulated particles of PC film 12 are conveyed to a first friction washer 28.

The granulated particles of PC film 12 are washed in the first friction washer 28, which is configured with an inclined cylindrical trough and an inclined fast-running paddle screw to dewater and clean the granulated particles of PC film 12 discharged from the wet grinder 26. The inclined paddle screw is fixed in the housing of the friction washer 28 by means of bearings, and is enclosed in a stainless steel screen.

The shredded and granulated particles of PC film 12 and water are fed at the lower end of the trough, with the inclined paddle screw transporting the material upward, and spinning at a high speed, for example 1,000 rpm.

The granulated particles of PC film 12 are washed in the first friction washer 28 while they are being transported to an outlet at the top of the trough of the first friction washer 28. The contaminates and the water are passed through the fine stainless steel screen to the trough wall, while the friction of the high speed screw further cleans the granulated particles of PC film 12. Following the first friction washer 28 is a second washing screw 22 which provides additional resonance time for the granulated particles of PC film 12 therein. Following the second washing screw 22 is a turbo washer 30 to provide additional cleansing of the granulated particles of PC film 12 and separation of contaminants from the PC film 12. Following the turbo washer 30 is a second friction washer 28 that washes the granulated particles of PC film 12 therein.

Operation of the first turbo washer 30 (as well as the second washing screw 22 and the second friction washer 28) can be either with cold water or hot water. In the case of a hot water bath, the temperature can be in the range of 120° F. to 190° F., with the preferred temperature being a water temperature of at least about 140° F. but not more than about 190° F. The hot water is used to affect additional cleaning of the granulated particles of PC film 12 in the washer in addition to the rotary motion imparted to the granulated particles of PC film 12. Temperatures over 190° F. tend to distort and/or melt the granulated particles of PC film 12.

It should be understood that friction washers 28 can be positioned in multiple different locations, such as in front of or after washing tanks (or in both such locations). As illustrated in the preferred embodiment of FIG. 1, friction washers 28 are positioned both before and after the turbo washer 30. A third friction washer 28 is also positioned after the even later in the process illustrated in FIG. 1.

Following the second friction washer 28, the granulated particles of PC film 12 are deposited in a first turbo dryer 40. The first turbo dryer 40 removes moisture from the granulated particles of PC film 12. The granulated particles of PC film 12 next move to a second turbo washer 30 wherein they are in effect rinsed with water. The rinsed granulated particles of PC film 12 are then moved (e.g., by a pump 32 as shown in FIG. 2) to a water cyclone, which is generally referred to as a hydrocyclone 34, such as for example a hydrocyclone 34 of the type produced by Herbold Meckesheim. The hydrocyclone 34 operates under water pressure from the pump 32 which moves water in a spiral to further separate contaminates from the granulated particles of PC film 12 and further separate layers of the granulated particles of PC film 12 by rotational forces of the moving water within the hydrocyclone 34.

The granulated particles of PC film 12 leave the hydrocyclone 34 at its upper end with the main stream of water, with any sinking material (higher density material) at the lower end. The hydrocyclone 34 operates in conjunction with the pump 32 and the turbo washer 30 to provide additional cleansing of the granulated particles of PC film 12 and separation of contaminants from the granulated particles of PC film 12. The water from the hydrocyclone 34 continues to transport the granulated particles of PC film 12 to (a vibrating screening apparatus 38 shown in FIG. 2 and then to) a third friction washer 36.

Upon exiting the third friction washer 36, the granulated particles of PC film 12 are deposited into second and third turbo dryers 40. The second and third turbo dryers 40 removes moisture from the granulated particles of PC film 12. (Referring to FIG. 2, a pneumatic transport system 42 may be used to move the granulated particles of PC film 12 between components.) The third turbo dryer 40 removes additional moisture from the granulated particles of PC film 12. The granulated particles of PC film 12 now are typically in the form of flakes which are then deposited into a film flake buffer silo 48.

Additional drying could optionally be performed in a thermal drying apparatus 46 (shown in FIG. 2) which uses heat to remove additional moisture from the flakes of PC film 12. In FIG. 2, a series of pneumatic transport systems 42 interconnect the various dryers and the film flake buffer silo 48. It should be understood that additional turbo dryers and/or thermal drying apparatuses could be installed in the system and coupled with the pneumatic transport systems.

From the film flake buffer silo 48, the flakes of PC film are moved (e.g., via a pneumatic transport system 42) to additional processing apparatus including a plastcompactor 50, which may be any commercially available such device. In one such plastcompactor 50, a rotating disk and a fixed compaction disk are used with both disks configured with screw-fitted and replaceable kneading rails. The flakes of PC film 12 are conveyed continuously from the film flake buffer silo 48 through the center of the fixed disk into the processing area of the plastcompactor 50 by means of a feed screw. The material is rapidly heated up by the friction against and between the compactor disks. During the operation in the plastcompactor apparatus, the flakes of PC film are warmed up because of friction and start to soften. The surfaces of the flakes of PC film 12 start to fuse, resulting in worm-shaped formations. The additional heating in the plastcompactor 50 further reduces moisture in the worm-shaped formations of PC film 12. In a typical operation of the methods described herein, the PC film 12 has a moisture content of not more than 10% by weight.

From the plastcompactor apparatus 50, the worm-shaped formations of PC film 12 are moved to a second granulator 52 which reduces the worm-shaped formations of PC film 12 to the required agglomerated granulated object size. The specific size of the agglomerated granules of PC film 12 is selected by changing a screen inside the second granulator 52. The second granulator 52 further removes any additional moisture from the granules of PC film 12 and compacts the dry ground granules of PC film 12, without addition of water, into granulated objects of near-virgin quality blown film product.

In one embodiment of the method, a controller 54 is used to control the various functions of the apparatus including water temperatures, air pressures, time periods, the specific machine granular size, and the speed of operation.

The controller 54 may be a microprocessor coupled to the various apparatus of the system. The controller 54 may also be a server coupled to an array of peripherals, or a desktop computer, or a laptop computer, or a smart-phone. It is also contemplated that the controller may be configured to control each individual machine, and may be remote from any of the apparatus. Communication between the controller 54 and the various apparatuses may be either by hardwired or wireless devices. A memory/database coupled to the controller 54 may be remote from the controller 54. The controller 54 typically includes one or more input devices, for example a mouse and/or a keyboard, and a display device, for example a monitor screen or a smartphone. Such devices can be hardwired to the controller or connected wirelessly with appropriate software, firmware, and hardware. The display device may also include a printer coupled to the controller 54. The display device may be configured to mail or fax reports as determined by a user. The controller 54 may be coupled to a network, for example, a local area network or a wide area network, which can be one of a hardwired network and a wireless network, for example a Bluetooth network or an Internet network, for example, by a WI-FI connection or a "cloud" connection.

In another embodiment a water treatment apparatus 60 is coupled to the various wash apparatus to recycle and filter the water used within the system for continued use. The quality of the water will vary at various stages of the process, with the recycling and filtering of the water controlled by the operator and/or in conjunction with the controller 54.

In a further embodiment, one or more testing stations may be installed to test the quality of the PC film 12 being processed. One such test is the "gel count" test described above. However, other appropriate tests can be implemented as determined by the operator. The test stations can be coupled to the controller 54 to automatically monitor, test, and report results by configuring the controller 54. Testing is typically performed at various stages of the process as determined by the operator.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present process and system has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the process and system as described herein may be made, none of which depart from the spirit or scope of the present disclosure. The particular embodiments and applications were chosen and described to provide the best illustration of the principles of the process and system and their practical application to thereby enable one of ordinary skill in the art to utilize the process and system in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system for processing a supply of post-consumer scrap linear low density polyethylene film or low density polyethylene film into near-virgin quality blown film product, comprising:

a shredder configured to tear the supply of post-consumer scrap linear low density polyethylene film or low density polyethylene film in the shredder, wherein surface area of the film is exposed, including delaminating the film;

a water bath configured to wet and agitate the torn film in the water bath to remove contaminates from the delaminated film;

a grinder configured to grind the wetted, delaminated film into ground film to reduce it in size;

at least one washing device configured to wash the ground film to remove additional contaminates from the ground film, wherein the at least one washing device contains hot water;

wherein one of the water bath or the at least one washing device includes a surfactant;

at least one dryer configured to dry the ground film into flakes of film containing not more than 10% by weight of water content; and additional processing apparatus configured to process the flakes of film into granulated objects of near-virgin quality blown film product.

2. The system of claim 1, additionally comprising:

a metal detector configured to detect metal in post-consumer scrap linear low density polyethylene film or low density polyethylene film prior to providing it to the shredder.

3. The system of claim 2, wherein the metal detector subjects the post-consumer scrap linear low density polyethylene film or low density polyethylene film to a magnetic field to identify ferrous metal, wherein the system additionally comprises:

a machine configured to remove detected ferrous metal.

4. The system of claim 2, additionally comprising:

a manual removal station configured to facilitate a manual removal of detected metal.

5. The system of claim 1, additionally comprising:

a detector configured as an X-ray machine to detect a non-film object in the post-consumer scrap linear low density polyethylene film or low density polyethylene film.

6. The system of claim 1, wherein the water bath comprises:

a prewash/sink/float tank apparatus that separates high density materials from the delaminated film.

7. The system of claim 6, wherein the water bath additionally comprises:

a first washing screw that initially wets the delaminated film received from the shredder and then conveys the wetted, delaminated film to the prewash/sink/float tank apparatus.

8. The system of claim 1, wherein the at least one washing device comprises:

a first friction washer; and a first turbo washer.

9. The system of claim 8, wherein the at least one washing device additionally comprises:

a second washing screw located intermediate the first friction washer and the first turbo washer; and a second friction washer located subsequent to the first turbo washer.

10. The system of claim 1, wherein the hot water is at least about 140 degrees Fahrenheit, but not more than about 190 degrees Fahrenheit.

11. The system of claim 1, wherein the surfactant comprises:
a detergent; and
wherein the surfactant optionally comprises at least one of an oxidizer and a bleaching agent.

12. The system of claim 1, additionally comprising:
a second turbo washer subsequent to the at least one washing device, the second turbo washer being configured to rinse the ground film.

13. The system of claim 12, additionally comprising:
a first turbo dryer located intermediate the at least one washing device and the second turbo washer, the first turbo dryer being configured to remove moisture from the ground film.

14. The system of claim 1, additionally comprising:
a hydrocyclone located subsequent to the at least one washing device, the hydrocyclone being configured to further separate contaminates from the ground film and further separate layers of the ground film.

15. The system of claim 14, additionally comprising:
a third friction washer located intermediate the hydrocyclone and the at least one dryer.

16. The system of claim 1, wherein the at least one dryer comprises:
a second turbo dryer; and
a third turbo dryer.

17. The system of claim 1, additionally comprising:
a film flake buffer silo located intermediate the at least one dryer and the additional processing apparatus, the flakes of film being temporarily deposited into the film flake buffer silo.

18. The system of claim 1, wherein the additional processing apparatus comprises:
a plastcompactor arranged to heat and further reduce moisture contained in the flakes of film, the plastcompactor fusing the flakes of film into formations of film; and
a second granulator located subsequent to the plastcompactor, the second granulator reducing the formations of film into the granulated objects of near-virgin quality blown film product.

19. The system of claim 1, wherein the elements of the system are arranged and configured to produce granulated objects of blown film product having a gel count that does not exceed 1,000 gels on a 12 inch by 12 inch square segment.

20. The system of claim 1, additionally comprising:
a conveyor network configured to interconnect the various elements of the systems, wherein the conveyor network comprises at least one of a storage conveyor, an inclines conveyor, a discharge belt, a transport screw, and a pneumatic transport tube.

21. A system for processing a supply of post-consumer scrap linear low density polyethylene film or low density polyethylene film into near-virgin quality blown film product, comprising:
a shredder configured to tear the supply of post-consumer scrap linear low density polyethylene film or low density polyethylene film in the shredder, wherein surface area of the film is exposed, including delaminating the film;
a first washing screw that wets delaminated film received from the shredder;
a prewash/sink/float tank apparatus that removes contaminates from the delaminated film received from the first washing screw, the prewash/sink/float tank apparatus separating high density materials from the delaminated film;
a grinder configured to grind the wetted, delaminated film into ground film to reduce it in size;
a washing device configured to wash the ground film to remove additional contaminates from the ground film, wherein the washing device contains hot water at a temperature of between about 140 degrees Fahrenheit and about 190 degrees Fahrenheit, and wherein the washing device comprises:
a first friction washer that receives the ground film from the grinder;
a second washing screw located subsequent to the first friction washer;
a first turbo washer located subsequent to the second washing screw; and
a second friction washer located subsequent to the first turbo washer;
wherein one of the first washing screw, the prewash/sink/float tank apparatus, and the washing device includes a surfactant;
a second turbo washer subsequent to the washing device, the second turbo washer being configured to rinse the ground film;
a first turbo dryer located intermediate the washing device and the second turbo washer, the first turbo dryer being configured to remove moisture from the ground film;
a hydrocyclone located subsequent to the first turbo dryer, the hydrocyclone being configured to further separate contaminates from the ground film and further separate layers of the ground film;
a third friction washer located subsequent to the hydrocyclone;
at least one additional turbo dryer located subsequent to the third friction washer, at least one additional turbo dryer being configured to dry the ground film into flakes of film containing not more than 10% by weight of water content;
a plastcompactor located subsequent to the second and third turbo dryers, the plastcompactor being arranged to heat and further reduce moisture contained in the flakes of film, the plastcompactor fusing the flakes of film into formations of film; and
a second granulator located subsequent to the plastcompactor, the second granulator reducing the formations of film into the granulated objects of near-virgin quality blown film product.

\* \* \* \* \*